Dec. 1, 1936. J. B. CARY ET AL 2,062,294
CROP DUSTER
Original Filed Feb. 21, 1930
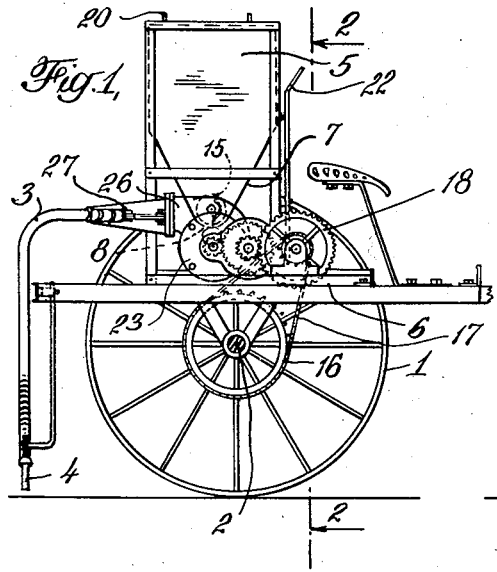
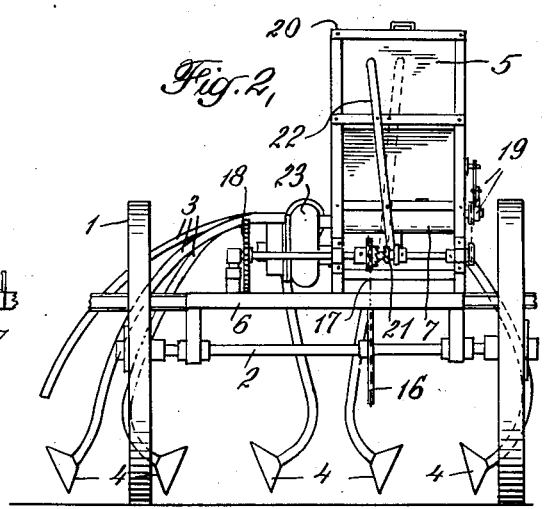
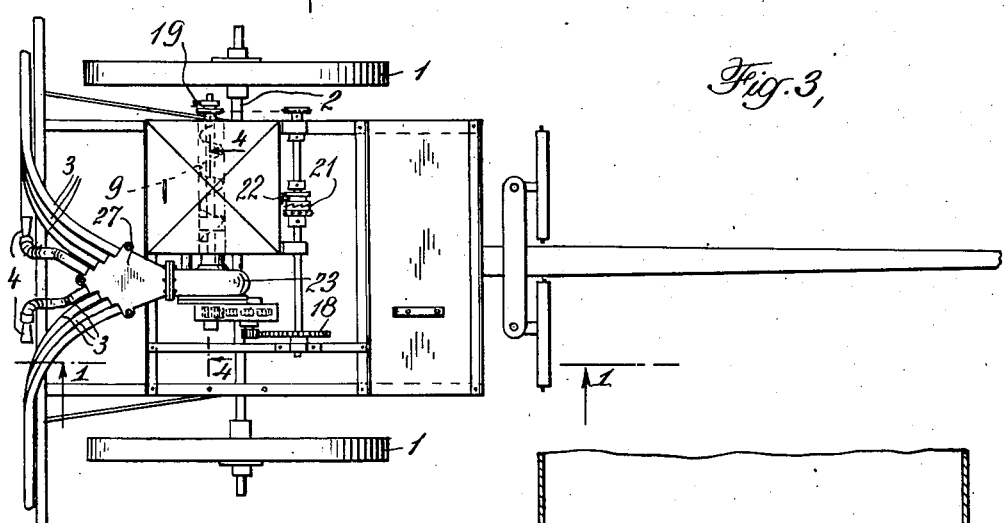
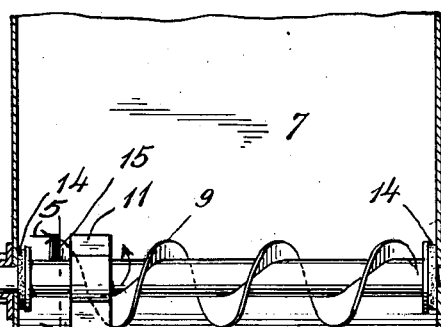
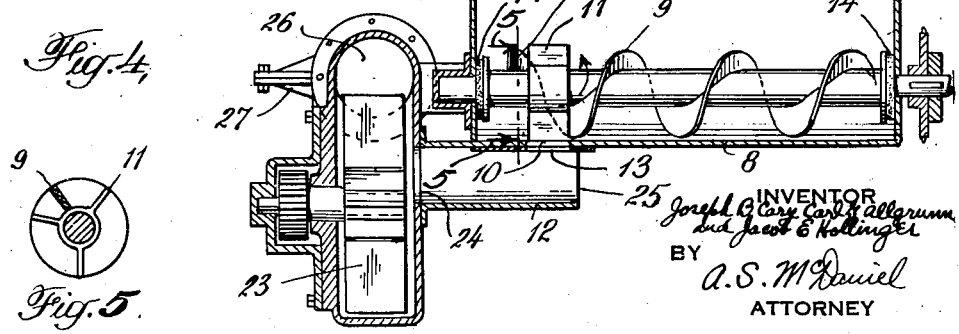

Patented Dec. 1, 1936

2,062,294

UNITED STATES PATENT OFFICE 2,062,294

CROP DUSTER

Joseph B. Cary, Buffalo, and Carl G. Allgrunn and Jacob E. Hollinger, Middleport, N. Y., assignors to Niagara Sprayer and Chemical Company, Inc., Middleport, N. Y., a corporation Refiled for abandoned application Serial No. 430,285, February 21, 1930. This application November 22, 1932, Serial No. 643,948

1 Claim. (Cl. 43—148)

The present invention relates to crop dusting apparatus and has to do particularly with an apparatus for blowing and distributing a fungicide or insecticide in the form of a dry powder or dust upon soil, plants, or the like.

The invention relates particularly to that general class of apparatus wherein the insecticide or fungicide material, or the like, in powder form is carried in a reservoir mounted upon an appropriate vehicle for transportation and is delivered gradually into a current of air, which dust-laden air is then divided into a plurality of streams which are in turn directed independently upon the plants to be treated, thus blowing the dust onto and about the plants with substantial force so that the dust spreads and settles over all of the foliage and penetrates substantially to the less accessible portions thereof.

Dusting apparatus of this class is commonly mounted upon a horse drawn or motor propelled carriage which is driven through the field with the dust discharging nozzles of the apparatus appropriately directed upon the plants undergoing treatment. The dust is fed continuously to the air current so that a continuous stream of dust-laden air comes in contact with the plants as the vehicle passes along. The practical necessity of dividing the dust-laden air stream into a plurality of independent branches is occasioned by the desirability of directing the dust streams upon the plants from opposite sides and from different directions to thereby effect thorough treatment and by the necessity of covering a substantial width of the field at each passage of the dusting apparatus to thereby make the dusting operation possible with a reasonable expenditure of time and effort.

It is an object of the invention to provide an apparatus of the character disclosed in which, in combination with improved dust distributing and dividing means, a controlled feed of the dust into the air stream is effected with particular reliability and with particular uniformity relative to the speed of the vehicle. The apparatus provides for positive regulation of the rate of feed of the dust so that a proper and desired amount of dust is utilized over a given area of treated vegetation and further provides, by positively actuated means of novel construction and combination of parts, for delivery of the dust upon the plants at a rate which is proportionate to the speed of the vehicle so that a uniform distribution of the dust over the area traversed is effected.

It is also an object of the invention to provide an apparatus of the character disclosed in which a particularly effective and uniform distribution of dust throughout the air stream is accomplished and in which an accurate division of this dust-laden air stream into a relatively large number of independent discharge streams is subsequently effected. The present invention avoids localization of dust in certain portions of the main air stream. With the dust distributed uniformly in the main air stream, accurate division of the main stream into a plurality of similar discharge streams thereby effects accurate proportioning of the dust into the several streams. This combination of features makes possible at all times the delivery of substantially identical streams of dust-laden air into the several respective discharge ducts with corresponding uniformity of treatment of the crop over an extended area upon each passage of the apparatus.

It is a further object of the invention to provide an embodiment which comprises novel features of construction and combination of parts which cooperate to effect, in a duster of the character disclosed, reliability, dependability and convenience of operation, positive actuation in all of the elements of the dusting operation and notable uniformity in the matter of distribution of the dust.

The particular features of construction, design, combination and arrangement of parts by means of which the above stated and other objects and advantages are effected are fully described in the following specification and are illustrated in the drawing which is made a part hereof. In said drawing, Figure 1 is a vertical side elevational view of a dusting apparatus embodying the invention, one of the wheels of the carriage being removed in the interest of clearer illustration; Figure 2 is a front elevational view of the apparatus taken, however, on substantially the plane indicated at 2—2 in Figure 1 to avoid encumbering the illustration with certain parts not pertinent to the invention; Figure 3 is a plan view of the apparatus; Figure 4 is a detail sectional view taken on the plane as indicated at 4—4 in Figure 3, showing the feeding means for the dust; Figure 5 is a cross-sectional view on line 5—5 of Figure 4 illustrating a portion of the feeding mechanism shown in the latter figure.

In the embodiment of the invention here shown and described, the carriage of the apparatus is indicated as a two-wheeled horse drawn vehicle having wheels 1 mounted on a rotating axle 2, the wheels being adjustable lengthwise of the axle so that they may be spaced apart different distances according to the spacing of the rows of plants which are to be treated. A plurality of dust discharge lines indicated at 3, here shown as eight in number, extend out from the apparatus and terminate in flattened expanded portions or nozzles 4, as shown. The discharge tubes 3 and nozzles 4 are here shown in appropriate arrangement to dust four parallel rows of plants as, for instance, potatoes. The vehicle moves along lengthwise of the rows, each row of plants being dusted by a pair of the nozzles 4 positioned as shown to direct the dust in upon the plants from the respective sides thereof. The vehicle is driven down the field and so guided that the respective rows of plants pass between the two nozzles of each pair. It is to be understood that the arrangement of the dust discharge lines 3 and nozzles 4, here shown, is merely illustrative, and that any desired arrangement of these parts can be effected as desired through the medium of the flexible lines 3 to thereby accommodate the apparatus to various uses.

A dust reservoir or container 5 is mounted upon the framework 6 of the carriage, as shown, and is provided with a hopper portion 7 formed by slanting two opposite sides of the reservoir toward each other. The hopper portion 7 has a rounded bottom 8 shaped to receive a dust feed screw 9, as best shown in Figure 4.

Referring particularly to Figure 4, the feed screw 9 operates in the direction indicated by the arrow and serves to feed dust from the hopper along to the left in said figure by movement of the screw. The rounded bottom portion 8 is provided at its lower edge adjacent the discharge end thereof with a slot 10 which lies beneath the discharge end of feed screw 9, as shown. At this point feed screw 9 is provided with a wiper member 11 affixed to the shaft of the feed screw and operating past slot 10 by reason of the rotation of the feed screw. Member 11 serves to positively feed or "wipe" the dust through slot 10 into a receiving tube 12 located beneath the slot 10, as shown. Member 11 is of slightly larger outside dimension than feed screw 9, as shown, so that as the screw feeds the dust up to member 11 this member with its close fit inside the hopper bottom 8 serves to feed or "wipe" the dust through slot 10 into the receiving tube 12. An adjustable slide valve 13 is provided to regulate the size of slot 10 and thereby control the amount of dust which is fed by the screw 9. Felt washers 14 are provided to prevent leakage of the dust out of the apparatus, and screw 9 is terminated short of the end of hopper bottom 8, as indicated at 15, so that any dust which passes the wiper 11 without being fed through slot 10 finds an opportunity to work back up into the hopper from whence it again subsequently is picked up and fed by the feed screw 9.

Feed screw 9, as well as all of the other moving parts of the apparatus, is operated from the carriage wheels 1 through the medium of a sprocket 16 attached to the main axle 2 and connected by means of a suitable chain 17 to a train of gearing indicated generally at 18, which gearing is arranged in operative connection with the various parts of the apparatus. This driving connection serves also to operate an agitator through the medium of a cam and follower indicated at 19, the agitator not being shown in detail but consisting of a moving element located within the hopper to keep the dust in the hopper agitated so that a steady supply of dust will at all times be available to feed screw 9.

In the operation of the apparatus, the hopper is first filled with dust by removing the lid 20 which covers the top of the reservoir. After filling, lid 20 is returned to closed position and the vehicle is put in motion. A clutch mechanism 21 having a clutch handle 22 is provided so that the vehicle may be driven to the point where it is desired to begin dusting without having the mechanism of the dusting apparatus in operation. To put the apparatus into dusting operation the clutch lever 22 is moved into the position indicated in dotted lines in Figure 2 to thereby put the operating parts of the apparatus into driving engagement with the carriage wheels. Further movement of the carriage effects actuation of gearing 18 and thereby sets the moving parts of the apparatus in motion. Rotation of feed screw 9 in the direction indicated by the arrow is thereby effected and dust is moved lengthwise along hopper bottom 8 and fed through slot 10 into receiving tube 12 as above described. At the same time, the cam connection 19 sets the agitator in motion to distribute the dust within the hopper and thus provide an ample supply of dust above feed screw 9 so that the feed of dust into receiving tube 12 will be continuous. From the above, it will be seen that delivery of the dust to feed screw 9 and feeding of the dust by screw 9 is effected by positive actuation and is continuous. The amount of dust fed is controlled by valve 13. The rate at which the dust is fed into receiving tube 12 depends upon the speed of operation of feed screw 9 which in turn is proportionate to the speed with which the vehicle is driven over the ground. Thus, for a given vehicle speed, the rate of delivery of dust is controlled to the desired amount by means of valve 13. As the speed of the vehicle changes, the rate of feed changes correspondingly with the result that the distribution of dust per unit area covered by the apparatus is substantially uniform.

A fan or blower 23 is in communication with tube 12, and is also driven through the medium of the carriage wheels and associated driving mechanism. Blower 23 is a centrifugal type blower having its intake 24 connected to tube 12 for drawing in dust from the tube. Tube 12 is provided with openings at its end, opposite the fan, as indicated at 25, for the intake of air. The discharge outlet 26 of blower 23 is located substantially tangentially of the blower rotor, as shown, and at right angles to the intake 24. The blower 23 may be bolted to the dust reservoir 5, as here shown, or is otherwise appropriately secured rigidly to the framework of the carriage.

Provision is made for delivering the dust from tube 12 into the fan substantially axially thereof. In the embodiment here shown, the bottom of tube 12 lies substantially on the central axis of blower 23. It has been found that the major portion of the dust entering the fan from tube 12 enters from the bottom portion of the tube. It has been found that a more thorough and uniform distribution of the dust in the air stream issuing from blower 23 is effected when the dust is delivered into the fan substantially axially thereof. This is an important feature of the invention inasmuch as a uniform distribution of the dust throughout the air stream issuing from the blower is requisite to a uniform division of dust among the several discharge tubes. The embodiment here shown provides for these requirements. It will also be noted that, as the supply of dust in the hopper becomes nearly exhausted, the blower 23 will cause air to be drawn down through the hopper, around the feed screw, and through slot 10, thus effectually emptying the hopper and cleaning the dust out of the feed screw and surrounding parts.

The dust-laden air stream issuing from discharge outlet 26 of blower 23 enters a distributor head 27 preferably located immediately adjacent the blower, as shown. In this distributor head 27 division of the dust-laden air stream between the several dust discharge tubes 3 is effected.

The features above described provide for notably uniform distribution of the dust among the several discharge tubes 3. The manner in which the dust enters the blower 23, as above described, is important in getting a uniform distribution of dust throughout the current of air which issues from the blower and enters the distributor head 27. The distributor head 27 functions effectively to divide the uniformly dust-laden entering stream of air into a plurality of separate streams and thereby effects a uniform distribution of the dust among the several discharge tubes even when a large number of discharge tubes are employed. The accomplishment of these results is an important part of the invention. The positive screw feed and associated parts, acting in combination with the fan and distributor head, as disclosed, combine a positive and continuous feed of dust controlled to the proper amount relative to the distance traversed by the carriage and properly proportioned to the speed of the carriage with a particular uniformity of distribution into the several discharge lines, thereby providing a dusting apparatus of superior characteristics. The invention is defined in the following claim, and is defined in terms of the construction, design, combinations and arrangements of parts which are responsible for the above described novel characteristics and advantages of the apparatus.

This application is substituted for application Serial Number 430,285 previously filed by the present applicants.

This application has been divided and certain subject matter not claimed herein has been claimed in a divisional application Serial Number 696,066.

What we claim is:

In a crop dusting apparatus of the character disclosed, a dust-containing reservoir having a discharge opening, and dust feeding means comprising a shaft, a feed screw provided on said shaft extending to and past the effective discharge portion of said opening and terminating short of the end of said shaft for feeding dust to said opening, and means provided on said shaft adjacent the discharge opening and intermediate the ends of the feed screw for feeding dust through said opening, whereby dust is fed positively and continuously to said opening and is forcibly discharged therethrough, and dust which is not discharged through said opening is conveyed past the opening and returned to the body of dust in the reservoir for subsequent feeding.

JOSEPH B. CARY.
CARL G. ALLGRUNN.
JACOB E. HOLLINGER.